(12) United States Patent
Wang et al.

(10) Patent No.: US 12,277,079 B2
(45) Date of Patent: Apr. 15, 2025

(54) DIRECT MEMORY ACCESS ARCHITECTURE, SYSTEM AND METHOD, ELECTRONIC DEVICE, AND MEDIUM

(71) Applicant: SUZHOU METABRAIN INTELLIGENT TECHNOLOGY CO., LTD., Jiangsu (CN)

(72) Inventors: Hongliang Wang, Jiangsu (CN); Qi Mu, Jiangsu (CN); Deshan Zhang, Jiangsu (CN); Wei Liu, Jiangsu (CN); Rengang Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,096

(22) PCT Filed: Nov. 28, 2022

(86) PCT No.: PCT/CN2022/134792
§ 371 (c)(1),
(2) Date: Jun. 25, 2024

(87) PCT Pub. No.: WO2023/185035
PCT Pub. Date: Oct. 5, 2023

(65) Prior Publication Data
US 2024/0419617 A1    Dec. 19, 2024

(30) Foreign Application Priority Data
Apr. 2, 2022 (CN) .................. 202210340235.X

(51) Int. Cl.
G06F 13/28 (2006.01)
G06F 13/16 (2006.01)
G06F 13/24 (2006.01)

(52) U.S. Cl.
CPC .......... G06F 13/28 (2013.01); G06F 13/1673 (2013.01); G06F 13/24 (2013.01)

(58) Field of Classification Search
CPC ....... G06F 13/28; G06F 13/1673; G06F 13/24
See application file for complete search history.

(56) References Cited

U.S. PATENT DOCUMENTS 6,145,016 A    11/2000  Lai et al.
7,912,997 B1    3/2011  Murray
(Continued)

FOREIGN PATENT DOCUMENTS

CN         2507066 Y    8/2002
CN       102411549 A    4/2012
(Continued)

OTHER PUBLICATIONS

International Search Report and Written Opinion received for PCT Serial No. PCT/CN2022/134792 on Feb. 10, 2023, 9 pgs.
(Continued)

Primary Examiner — Henry Tsai
Assistant Examiner — Kim T Huynh
(74) Attorney, Agent, or Firm — Merchant & Gould P.C.

(57) ABSTRACT

Provided is a direct memory access architecture, including: a direct memory access control component, a read data moving component, a write data moving component and a data storage component; wherein the direct memory access control component includes a control register, a read descriptor storage component, a write descriptor storage component, a read command transfer component and a write command transfer component; the control register is configured to obtain descriptor address information; the read descriptor storage component is configured to store a read descriptor obtained by using the control register; the write descriptor storage component is configured to store a write
(Continued)

descriptor obtained by using the control register; the read command transfer component is configured to send, to the read data moving component, a read command; the write command transfer component is configured to send, to the write data moving component, a write command.

20 Claims, 7 Drawing Sheets

(56) References Cited

U.S. PATENT DOCUMENTS

| | | | | |
|---|---|---|---|---|
| 8,019,825 | B1* | 9/2011 | Johnston | H01M 4/925 |
| | | | | 709/212 |
| 9,053,093 | B1* | 6/2015 | Nguyen | G06F 12/1081 |
| 2017/0147517 | A1* | 5/2017 | Chen | G06F 13/4282 |

FOREIGN PATENT DOCUMENTS

| | | |
|---|---|---|
| CN | 102841871 A | 12/2012 |
| CN | 103714027 A | 4/2014 |
| CN | 110389709 A | 10/2019 |
| CN | 111190842 A | 5/2020 |
| CN | 111538679 A | 8/2020 |
| CN | 113986533 A | 1/2022 |
| CN | 114443529 B | 5/2022 |

OTHER PUBLICATIONS

Chinese Search Report received for CN Serial No. 202210340235.X on May 26, 2022, 2 pgs.
Chinese Search Report received for CN Serial No. 202210340235.X, 1 pg.
Chinese First Office Action received for CN Serial No. 202210340235.X on May 12, 2022, 7 pgs.
Chinese Decision to Grant received for CN Serial No. 202210340235.X on May 31, 2022, 2 pgs.

* cited by examiner

Fig. 2

| | 31 bits 0 | ADDRESS |
|---|---|---|
| Descriptor 0 Status | Reserved \| Done | 0xF000_0000 |
| Descriptor 1 Status | Reserved \| Done | 0xF000_0004 |
| | Reserved \| Done | 0xF000_0008 |
| ⋮ | | |
| Descriptor 127 Status | Reserved \| Done | (1) |

Descriptor 0:
| | |
|---|---|
| SRC_ADDR_LOW | 0xF000_0200 |
| SRC_ADDR_HIGH | 0xF000_0204 |
| DEST_ADDR_LOW | 0xF000_0208 |
| DEST_ADDR_HIGH | 0xF000_020C |
| DESCRIPTOR_ID + DMA_LENGTH | 0xF000_0210 |
| RESERVED | 0xF000_0214 |
| RESERVED | 0xF000_0218 |
| RESERVED | 0xF000_021C |

Descriptor 1:
| | |
|---|---|
| SRC_ADDR_LOW | 0xF000_0220 |
| SRC_ADDR_HIGH | 0xF000_0224 |
| DEST_ADDR_LOW | 0xF000_0228 |
| DEST_ADDR_HIGH | 0xF000_022C |
| DESCRIPTOR_ID + DMA_LENGTH | 0xF000_0230 |
| RESERVED | 0xF000_0234 |
| RESERVED | 0xF000_0238 |
| RESERVED | 0xF000_023C |

Descriptor 2:
| | |
|---|---|
| SRC_ADDR_LOW | 0xF000_0240 |
| SRC_ADDR_HIGH | 0xF000_0244 |
| DEST_ADDR_LOW | 0xF000_0248 |
| DEST_ADDR_HIGH | 0xF000_024C |
| DESCRIPTOR_ID + DMA_LENGTH | 0xF000_0250 |
| RESERVED | 0xF000_0254 |
| RESERVED | 0xF000_0258 |
| RESERVED | 0xF000_025C |

Fig. 3

| | 31 bits 0 | ADDRESS |
|---|---|---|
| Descriptor 0 Status | Reserved \| Done | 0xF000_0000 |
| Descriptor 1 Status | Reserved \| Done | 0xF000_0004 |
| | Reserved \| Done | 0xF000_0008 |

⋮

| | | |
|---|---|---|
| Descriptor 127 Status | Reserved \| Done | (1) |

Descriptor 0:
| | |
|---|---|
| 1000_0000 | 0xF000_0200 |
| 0000_0000 | 0xF000_0204 |
| 5000_0000 | 0xF000_0208 |
| 0000_0000 | 0xF000_020C |
| 0000_4000 | 0xF000_0210 |
| RESERVED | 0xF000_0214 |
| RESERVED | 0xF000_0218 |
| RESERVED | 0xF000_021C |

Descriptor 1:
| | |
|---|---|
| 2000_0000 | 0xF000_0220 |
| 0000_0000 | 0xF000_0224 |
| 0001_0000 | 0xF000_0228 |
| 0000_0000 | 0xF000_022C |
| 0004_2000 | 0xF000_0230 |
| RESERVED | 0xF000_0234 |
| RESERVED | 0xF000_0238 |
| RESERVED | 0xF000_023C |

Descriptor 2:
| | |
|---|---|
| 2000_0000 | 0xF000_0240 |
| 0000_0001 | 0xF000_0244 |
| 1000_0000 | 0xF000_0248 |
| 0000_0000 | 0xF000_024C |
| 0008_1000 | 0xF000_0250 |
| RESERVED | 0xF000_0254 |
| RESERVED | 0xF000_0258 |
| RESERVED | 0xF000_025C |

DIRECT MEMORY ACCESS ARCHITECTURE, SYSTEM AND METHOD, ELECTRONIC DEVICE, AND MEDIUM

CROSS-REFERENCE TO RELATED DISCLOSURE

The present application is a National Stage Application of PCT International Application No.: PCT/CN2022/134792 filed on Nov. 28, 2022, which claims priority to Chinese Patent Application 202210340235.X, filed in the China National Intellectual Property Administration on Apr. 2, 2022, the disclosure of which is incorporated herein by reference in its entirety.

TECHNICAL FIELD

The present disclosure relates to the field of computer technologies, and in particular, to a direct memory access architecture, system and method, an electronic device, and a medium.

BACKGROUND

Peripheral Component Interconnect Express (PCI-Express) is a high-speed serial computer expansion bus standard. PCIE has two data transfer modes. One data transfer mode is Direct Memory Access (DMA), and in this data transfer mode, data transfer is completed by a special processor (usually a DMA controller) rather than a Central Processing Unit (CPU). In the DMA mode, very few CPU resources are occupied. The other data transfer mode is Programmed Input-Output (PIO), and in this data transfer mode, data transfer is processed by a CPU executing an Input/Output (I/O) port instruction according to a data unit of a byte or larger. In the PIO mode, a large amount of CPU resources is occupied, and the data transfer speed is much lower than that in the DMA mode. As such, the DMA mode is superior to the PIO mode.

There are currently two ways to implement DMA, which are respectively chain DMA and block DMA. During the process of DMA data transfer, it is required that a source physical address and a target physical address need to be contiguous. However, in some computer systems, contiguous memory addresses may not be contiguous physically, so the DMA data transfer needs to be completed in multiple times. In the block DMA, an interrupt is triggered after one piece of physically contiguous data is transferred, and then a host transfers a next piece of physically contiguous data. In the chain DMA, on the other hand, a linked list is used to describe physically non-contiguous memory space, and then the DMA controller is notified of a head address of the linked list, so that the DMA controller does not need to generate an interrupt after completing the transfer of a block of physically contiguous data, but instead transfers the next block of physically contiguous data according to the linked list, until the transfer is completed, and then generates an interrupt. However, the transfer efficiency of the current chain DMA is still low.

Therefore, regarding the problem of still low transfer efficiency of the chain DMA in the related art, no effective solution has been proposed yet.

SUMMARY

In view of this, some embodiments of the present disclosure provide a direct memory access architecture, system and method, an electronic device, and a medium, which increase the DMA transfer efficiency.

In order to solve the described technical problem, some embodiments of the present disclosure provide a direct memory access architecture for a digital circuit, the direct memory access architecture including: a direct memory access control component, a read data moving component, a write data moving component and a data storage component. The direct memory access control component includes a control register, a read descriptor storage component, a write descriptor storage component, a read command transfer component and a write command transfer component. The control register is configured to obtain descriptor address information based on setting from a host; the read descriptor storage component is configured to store a read descriptor obtained by using the control register; the write descriptor storage component is configured to store a write descriptor obtained by using the control register; the read command transfer component is configured to send, to the read data moving component, a read command obtained based on the read descriptor or the descriptor address information; the write command transfer component is configured to send, to the write data moving component, a write command obtained based on the read descriptor; and the read data moving component is configured to execute the read command, the write data moving component is configured to execute the write command, and the data storage component is configured to store read data obtained after executing the read command.

Some embodiments of the present disclosure further provide an electronic device which applies the direct memory access architecture.

Some embodiments of the present disclosure further provide a direct memory access system, including a host and the electronic device, wherein the host and the electronic device are connected via a target bus.

Some embodiments of the present disclosure further provide a direct memory access method, applied to the electronic device, the method including: when it is detected that a control register of a direct memory access control component is triggered, descriptor address information is acquired; a descriptor read command is generated by using the direct memory access control component based on the descriptor address information; the descriptor read command is executed by using a read data moving component to obtain descriptors, and the descriptors are written into a descriptor storage component of the direct memory access control component; the direct memory access control component is used to generate an access command based on the descriptors; and the access command is executed based on a type of the access command by using the read data moving component or a write data moving component.

Some embodiments of the present disclosure further provide a computer-readable storage medium for storing a computer program, wherein the computer program, when executed by a processor, implements the direct memory access method.

According to the embodiments of the present disclosure, the direct memory access architecture for the digital circuit includes: a direct memory access control component, a read data moving component, a write data moving component and a data storage component; the direct memory access control component includes a control register, a read descriptor storage component, a write descriptor storage component, a read command transfer component and a write command transfer component; wherein the control register is configured to obtain descriptor address information based on setting from a host; the read descriptor storage component is configured to store a read descriptor obtained by using the control register; the write descriptor storage component is configured to store a write descriptor obtained by using the control register; the read command transfer component is configured to send, to the read data moving component, a read command obtained based on the read descriptor or the descriptor address information; the write command transfer component is configured to send, to the write data moving component, a write command obtained based on the read descriptor; and the read data moving component is configured to execute the read command, the write data moving component is configured to execute the write command, and the data storage component is configured to store read data obtained after executing the read command.

The read data moving component and the write data moving component are provided in the direct memory access architecture, and are respectively configured to execute the read command and the write command. In addition, the read descriptor storage component and the write descriptor storage component are correspondingly provided, such that the digital circuit may implement processing of reading and writing in parallel. In addition, the read data moving component may also execute the read command obtained according to the descriptor address information, and may further move descriptors, such that the same set of components may be adopted to move both descriptors and data, thereby saving hardware resources.

In addition, the embodiments of the present disclosure also provide a system, a method, an electronic device and a medium, which also have the same beneficial effects.

BRIEF DESCRIPTION OF THE DRAWINGS

In order to describe the technical solutions in the embodiments of the present disclosure or in the related art more clearly, hereinafter, accompanying drawings requiring to be used in the embodiments or the related art will be introduced briefly. Apparently, the accompanying drawings in the following description merely relate to the embodiments of the present disclosure, and for a person having ordinary skill in the art, other accompanying drawings may also be obtained according to the provided accompanying drawings without any inventive effort.

FIG. 2 is a schematic structural diagram of a host memory provided according to the embodiments of the present disclosure;

FIG. 3 is an exemplary schematic structural diagram of a host memory provided according to the embodiments of the present disclosure;

DETAILED DESCRIPTION OF THE EMBODIMENTS

To make the objects, technical solutions and advantages of the embodiments of the present disclosure clearer, hereinafter, the technical solutions in embodiments of the present disclosure will be described clearly and thoroughly in combination with the accompanying drawings in the embodiments of the present disclosure. It is apparent that the embodiments described are not all embodiments but a part of embodiments of the present disclosure. All other embodiments obtained by a person having ordinary skill in the art based on the embodiments of the present disclosure without any inventive effort shall all fall within the scope of protection of the present disclosure.

Currently, the chain DMA has the problem of low transfer efficiency, including the lack of support for out-of-order data reception when reading data, inability to interconnect with standard buses, inability to perform read and write processing in parallel, and low bandwidth utilization, etc.

In order to solve the described problems, the embodiments of the present disclosure propose a novel direct memory access architecture for a digital circuit. The digital circuit may be, for example, a Field Programmable Gate Array (FPGA) circuit or a digital integrated circuit (digital IC). The direct memory access architecture includes: a direct memory access control component, a read data moving component, a write data moving component and a data storage component. The direct memory access control component includes: a control register, a read descriptor storage component, a write descriptor storage component, a read command transfer component and a write command transfer component.

Figure 1:
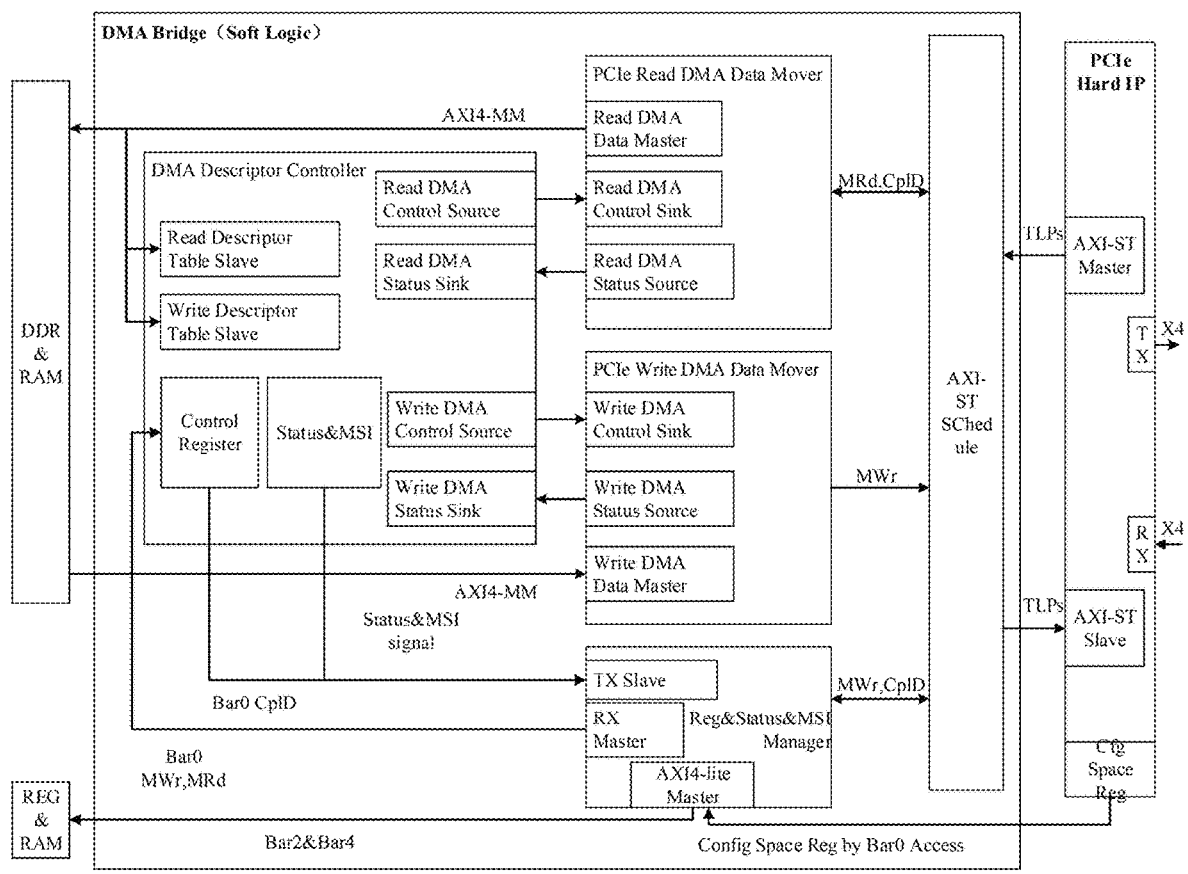
FIG. 1 is a schematic structural diagram of a direct memory access architecture provided according to the embodiments of the present disclosure.

Please refer to FIG. 1, FIG. 1 relates to an exemplary embodiment, and shows a direct memory access control component (also referred to as DMA Descriptor Controller in the embodiments), a read data moving component (also referred to as PCIe Read DMA Data Mover in the embodiments), a write data moving component (also referred to as PCIe Write DMA Data Mover in the embodiments), and a data storage component (also referred to as DDR&RAM in the embodiments). The direct memory access control component includes: a control register (also represented as Control Register in the embodiments), a read descriptor storage component (also referred to as Read Descriptor Table Slave in the embodiments), a write descriptor storage component (also referred to as Write Descriptor Table Slave in the embodiments), a read command transfer component (also referred to as Read DMA Control Source in the embodiments), and a write command transfer component (also referred to as Write DMA Control Source in the embodiments).

The control register is configured to obtain descriptor address information based on setting from a host. In some exemplary implementations, the host may set a register value of the control register, such that the control register may locate a descriptor according to the register value, i.e., the control register may obtain a descriptor address according to the register value, and then may read the descriptor from a host memory, so as to further perform DMA reading and writing according to the descriptor. In some embodiments, the control register (or may be referred to as a DMA descriptor control register) may be accessed via a Base Address register (BAR) space, for example, the control register may correspond to a BAR0 of a PCIe bus. In this case, an address offset corresponding to the control register may be 0x0000. It should be noted that the address offset may be set according to requirements, and will not be specifically limited.

In some embodiments, the structure of the control register may be as shown below:

TABLE 1

Schematic structure of a read status control register

| Address offset | Register | Access Permission | Description |
| --- | --- | --- | --- |
| 0x0000 | RC Read Status and Descriptor Base (Low) | R/W | RC read status and descriptor table storage address-low 32 bits among 64 bits in total. This address should be at an address boundary of 32 byte. |
| 0x0004 | RC Read Status and Descriptor Base (High) | R/W | RC read status and descriptor table storage address-low 32 bits. |
| 0x0008 | EP Read Descriptor FIFO Base (Low) | RW | Read descriptor FIFO address-low 32 bits among 64 bits in total. The address at this position is an FPGA internal bus address. |
| 0x000C | EP Read Descriptor FIFO Base (High) | RW | Read descriptor FIFO address-address of high 32 bits. |
| 0x0010 | RD_DMA_LAST_PTR | RW | Represent an ID of the last descriptor, and used to indicate when to stop execution during continuous reading/writing. |
| 0x0014 | RD_TABLE_SIZE | RW | Specify the size of a read descriptor table, which is set as the maximum number of descriptors minus 1. For example, this value may be 127. This value specifies a maximum descriptor ID. If the RC Read Status and Descriptor Base address is to be changed, before the changing, execution of all descriptors within RD TABLE SIZE should be completed. |
| 0x0018 | RD_CONTROL | RW | [31:1] Reserved. [0] Done. When set as 1, the descriptor controller writes a "done" bit in a status table for each completed descriptor. If this register is not set, the corresponding "done" bit is written only after a descriptor specified by RD_DMA_LAST_PTR is completed. Additionally, MSI needs to be sent after the last descriptor is completed. |
| 0x001C | RD_DMA_START | RW | Return a value of 0, and trigger the start of read DMA by writing (any value) to this register. |

In the above table, MSI represents Message Signal Interrupt, and is a mechanism in which a PCIe device triggers interrupt of a processor by writing a specific message to a specific address; RC represents Root Complex, which is a root assembly and generally refers to host; ED represents End Point, which may be a terminal device and is the digital circuit in some embodiments of the present disclosure, for example, ED may be an FPGA circuit; R represents Read; and W represents Write.

In some embodiments, the read descriptor storage component and the write descriptor storage component are first input first output memories, and the read descriptor storage component and the write descriptor storage component are predefined with storage addresses. FIFO is First Input First Output, i.e., a first input first output queue, or referred to as a first input first output memory. In this embodiment, the descriptor is stored in the FIFO in the digital circuit, and an address is assigned to the FIFO, allowing the FIFO to be identified by the address, such that the digital circuit may be interconnected with a standard bus, thereby facilitating development. Correspondingly, the control register includes a source address register, a destination address register, a descriptor size register and a trigger register. The destination address register is configured to store any one of the storage addresses.

It should be noted that, the example above illustrates a configuration when reading a read descriptor; and when reading a write descriptor, the structure of the control register is as follows.

TABLE 2

Schematic structure of a write status control register

| Address offset | Register | Access Permission | Description |
| --- | --- | --- | --- |
| 0x0100 | RC Write Status and Descriptor Base (Low) | R/W | See Read DMA Descriptor Control Register. |
| 0x0104 | RC Write Status and Descriptor Base (High) | R/W | See Read DMA Descriptor Control Register. |
| 0x0108 | EP Write Descriptor FIFO Base (Low) | RW | See Read DMA Descriptor Control Register. |
| 0x010C | EP Write Descriptor FIFO Base (High) | RW | See Read DMA Descriptor Control Register. |

TABLE 2-continued

Schematic structure of a write status control register

| Address offset | Register | Access Permission | Description |
|---|---|---|---|
| 0x0110 | WR_DMA_LAST_PTR | RW | See Read DMA Descriptor Control Register. |
| 0x0114 | WR_TABLE_SIZE | RW | See Read DMA Descriptor Control Register. |
| 0x0118 | WR_CONTROL | RW | See Read DMA Descriptor Control Register. |
| 0x011C | WR_DMA_START | RW | Return a value of 0, and trigger the start of write DMA by writing (any value) to this register |

The difference between the two lies in that, in this status, a start address offset of the DMA descriptor control register is set as 0x0100. Certainly, the address offset may also be set according to requirements, which is not specifically limited.

RC Write Status and Descriptor Base (Low) and RC Write Status and Descriptor Base (High), or RC Read Status and Descriptor Base (Low) and RC Read Status and Descriptor Base (High) constitute descriptor address information. According to the descriptor address information, the read descriptor or the write descriptor may be located and further read.

The direct memory access control component may generate a corresponding read command or write command according to the descriptor or the descriptor address information; and a controller, e.g., Read DMA Data Master and Write DMA Data Master in FIG. 1, may also be provided in each of the read data moving component and the write data moving component, and is configured to control execution of instructions. In order to achieve processing of reading and writing in parallel, in some embodiments of the present disclosure, the read descriptor storage component and the write descriptor storage component are provided. The read descriptor storage component is configured to store a read descriptor obtained by using the control register, and the write descriptor storage component is configured to store a write descriptor obtained by using the control register. The read descriptor is a descriptor that instructs the digital circuit to read data from the host into the digital circuit itself; and the write descriptor is a descriptor that instructs the digital circuit to write data of the digital circuit itself into the host. The read command transfer component and the write command transfer component work in cooperation with the read descriptor storage component and the write descriptor storage component. The read command transfer component is configured to send, to the read data moving component, a read command obtained based on the read descriptor or a read command obtained based on the descriptor address information. It may be understood that the read command obtained based on the descriptor address information is set as a command for reading a descriptor, and in this manner, the descriptor and data may be moved by using the same set of components, thereby saving hardware resources. The write command transfer component is configured to send, to the write data moving component, a write command obtained based on the read descriptor. In addition, the read data moving component and the write data moving component are further included. The read data moving component is configured to execute the read command, the write data moving component is configured to execute the write command, and the data storage component is configured to store read data obtained after executing the read command.

In some exemplary implementations, the descriptors are pre-stored in the host. In some exemplary implementations, a descriptor table is provided in the host memory, and the descriptor table has a space for storing descriptors. Herein, the specific number of the descriptors that are able to be stored is not limited, for example, may be 128. The size of a space corresponding to each descriptor is not limited, for example, may be 8 words, or may be 32 bytes. In addition, in some other embodiments, the descriptor table may also have status tables respectively corresponding to descriptors on a one-to-one basis, and data in the status tables may be updated according to the execution conditions of the descriptors. When necessary, the host may read data in the status table to determine the execution condition of each descriptor. If necessary, descriptors that have been executed may be updated, such that the digital circuit may continuously read and write data, thereby increasing the efficiency.

The present embodiment does not limit the specific forms of the status table and the descriptor table. In some embodiments, as shown in FIG. 2 which shows the structure of a host memory, the host memory adopts the form of a status table+a descriptor table, with the status table preceding and the descriptor table following. The address of the status table may be the address of RC Write Status and Descriptor Base or RC Read Status and Descriptor Base, and in this case, the address of the descriptor table is base address+offset address. The offset address is related to the total size of the status table, for example, as shown in FIG. 2, when there are 128 status tables and each status table occupies 32 bits, the offset address is 0x200. Each status table has 31 bits which serve as reserved operation bits (reserved), and the other bits are flag operation bits (done), wherein each flag operation bit is used to indicate the execution status of a corresponding descriptor.

The specific structure of the descriptor is not limited, and may be set as required. In some exemplary implementations, the structure of the read descriptor may be as follows.

TABLE 3

Schematic structure of read descriptor

| Address offset | Register name | Description |
| --- | --- | --- |
| 0x00 | RD_LOW_SRC_ADDR | Read a DMA source address - low byte, and a PCIe system memory address. |
| 0x04 | RD_HIGH_SRC_ADDR | Read a DMA source address - high byte. |
| 0x08 | RD_CTRL_LOW_DEST_ADDR | Read a DMA destination address - low byte, and an FPGA internal bus address. |
| 0x0C | RD_CTRL_HIGH_DEST_ADDR | Read a DMA destination address - high byte. |
| 0x10 | CONTROL | [31:25] Reserved. [24:18] Specify an ID of a descriptor, the maximum being 127. [17:0] Transfer size, in unit of DWORD (4 Bytes). The size cannot be 0. Transfer range is (1 MB-4 bytes); and if the size exceeds the range, processing is performed according to the boundary. |
| 0x14-0x1C | Reserved | N/A |

Correspondingly, the structure of the write descriptor may be as follows.

TABLE 4

Schematic structure of write descriptor

| Address offset | Register name | Description |
| --- | --- | --- |
| 0x00 | WD_LOW_SRC_ADDR | Write a DMA source address - low byte, and an FPGA internal bus address. |
| 0x04 | WD_HIGH_SRC_ADDR | Write a DMA source address - high byte. |
| 0x08 | WD_CTRL_LOW_DEST_ADDR | Write a DMA destination address - low byte, and a PCIe system memory address. |
| 0x0C | WD_CTRL_HIGH_DEST_ADDR | Write a DMA destination address - high byte. |
| 0x10 | CONTROL | [31:25] Reserved. [24:18] Specify an ID of a descriptor, the maximum being 127. [17:0] Transfer size, in unit of DWORD (4 Bytes). The size cannot be 0. Transfer range is (1 MB-4 bytes); and if the size exceeds the range, processing is performed according to the boundary. |
| 0x14-0x1C | Reserved | N/A |

Figure 4:
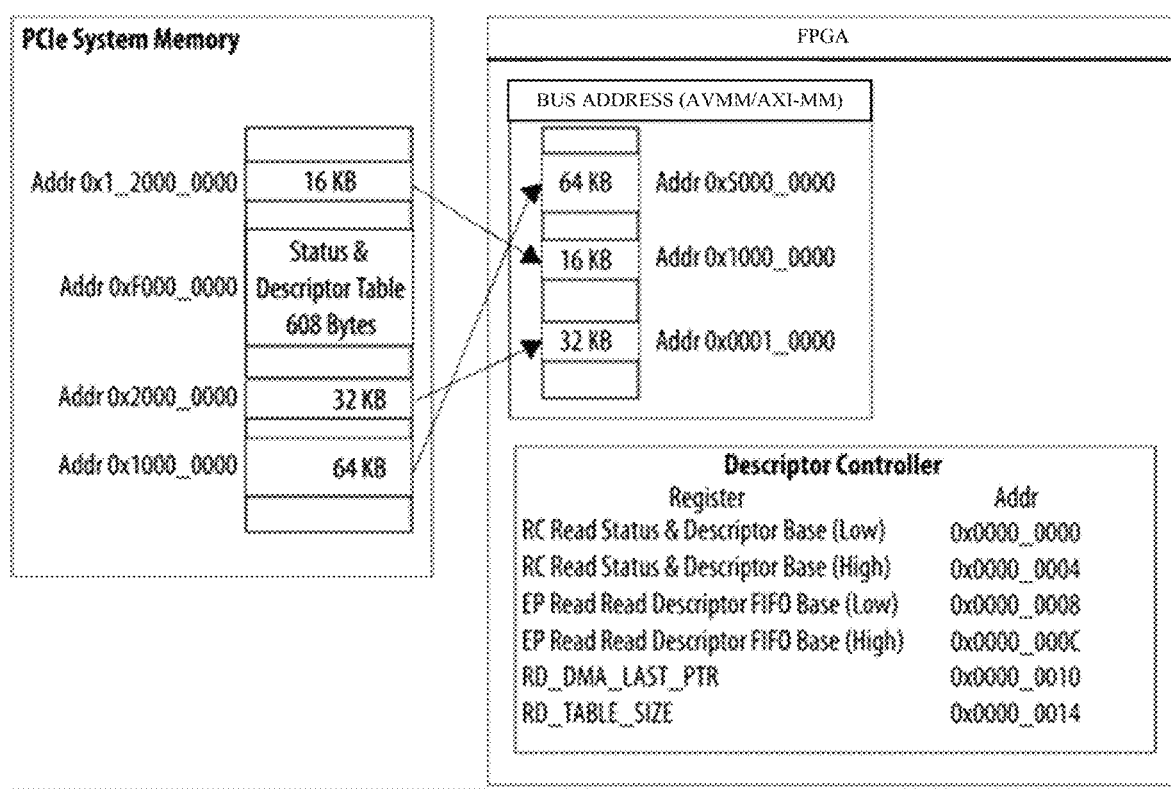
FIG. 4 is a schematic diagram of a data moving process provided according to the embodiments of the present disclosure.

The specific content of the descriptors is not limited, and may be set according to actual requirements. For example, please refer to FIG. 3, and FIG. 3 shows the exemplary content of three descriptors, i.e., descriptor 0, descriptor 1 and descriptor 2. Please refer to FIG. 4, FIG. 4 is a schematic diagram of a data moving process provided according to the embodiments of the present disclosure. In some exemplary implementations, three data blocks are moved from the host memory to an FPGA bus address space.

In order to complete the operation, the host first needs to calculate the size of a memory space requiring to be allocated. In some embodiments, entries in each status table are 4 bytes, and then 128 entries require a memory of 512 bytes; the size of each descriptor is 32 bytes, and taking FIGS. 2 and 3 as an example, the three descriptors require a memory of 96 bytes, and therefore the total memory allocation of the status table and the descriptor table is 608 bytes.

Then, the host allocates a memory of 608 bytes in a PCI Express address space, for example, an initial address of the allocated memory may be 0xf000_0000, and this address is written into a Root Complex Read Status and Descriptor register. If a base address is 0xf000_0000, then the address of the first descriptor is base address+offset address, i.e., 0xf000_0000+0x200. Therefore, a high 32-bit source address 0 is written into 0xf000_0204 of the host memory space, a low 32-bit source address 0x1000_0000 is written into 0xf000_0200, a high 32-bit destination address 0 is written into 0xf000_0200c, a low 32-bit destination address 0x5000_0000 is written into 0xf000_0208, 0x0000_4000 is written into 0xf000_0210, 16Kdwords (64 KB) are sent, and the descriptor ID is 0, thereby completing specific settings of the first descriptor. This setting process is repeated twice to complete settings of the remaining two descriptors, and an effect diagram after completion of the settings is FIG. 3.

The host configures a control register via bar0, such that the control register reads a read status descriptor base address, which may specifically use a 64-bit address. That is, the host writes a 0x0000_0000-high-32-bit read status descriptor base address in 0x0000_0004, and writes a 0xF000_0000-low-32-bit read status descriptor base address in 0x0000_0000. The digital circuit may obtain the descriptor address by adding 0x200 on this basis.

Further, the host configures an FIFO address of the control register via bar0. As the FIFO itself has no address concept, in order to enable same to adapt to a standard bus, when the FIFO of a bus interface is used, the address of the FIFO needs to be defined. For example, an 0x0000_0000-high-32-bit FIFO address may be written into 0x0000_000C, and an 0x0100_0000-low-32-bit FIFO address may be written into 0x0000_0008. At this time, a corresponding address of the FIFO on an FPGA internal bus is 0x0100_0000.

Then, the host writes a register RD_DMA_LAST_PTR, i.e., write 0x2 into 0x0000_0010, which represents that there are a total of 3 descriptors.

Finally, the host writes an arbitrary value at 0x0000_001c, so as to start DMA operation of the digital circuit.

Based on the direct memory access architecture, other components may be further added in the direct memory access architecture, so as to improve the performance of the direct memory access architecture. In some embodiments, the direct memory access control component is configured to receive a moving completion notification sent by the read data moving component and a moving completion notification sent by the write data moving component. In some exemplary implementations, as shown in FIG. 1, a DMA Descriptor Controller includes a Read DMA Status Sink (which may be referred to as a read status acquisition component) and a Write DMA Status Sink (which may be referred to as a write status acquisition component), which are connected to a Read DMA Status Source (which may be referred to as a read status generation component) and a Write DMA Status Source (which may be referred to as a write status generation component), respectively. The Read DMA Status Source and the Write DMA Status Source respectively generate a moving completion notification after executing the descriptors or the read command/write command, and send the generated notification to the Read DMA Status Sink and the Write DMA Status Sink, such that the control register knows the status. The direct memory access control component includes a status updating component, e.g., a Status&MSI component in FIG. 1. The status updating component is configured to update, upon detecting completion of execution of a target descriptor, target status bit data corresponding to the target descriptor in a system memory of the host. In some exemplary implementations, the target status bit data in a target status table corresponding to the target descriptor in the host may be updated via a TX Slave (which may be referred to as a status and interrupt reporting component) in a Reg&Status&MSI Manager (which may be referred to as a status and interrupt management component). In some exemplary implementations, an MWr write data packet may be generated via the TX Slave, and sent to the host via a PCIe bus.

It should be noted that, in order to implement a parallel reading and writing effect, in some embodiments of the present disclosure, two independent memory spaces may be respectively provided at the host, and are respectively used to store a read descriptor and a status table corresponding to the read descriptor, and a write descriptor and a status table corresponding to the write descriptor. After completion, the digital circuit may send an interrupt signal, and the host may determine whether the completion is a read completion or a write completion by judging which memory space has all its status tables in a completed status.

Further, the direct memory access control component includes an interrupt reporting component, wherein the interrupt reporting component is configured to send an interrupt message to the host upon detecting completion of execution of the target descriptor. The TX Slave in the Reg&Status&MSI Manager (which may be referred to as a status and interrupt management component) in FIG. 1 may also achieve the function of interrupt reporting; the Status&MSI component in the DMA Descriptor Controller may serve as the interrupt reporting component and cooperate with the TX Slave to generate the MWr write data packet, and send the MWr write data packet to the host via the PCIe bus, thereby achieving the effect of interrupt reporting. It may be understood that the content of the MWr write data packets corresponding to the interrupt reporting is different from the content of the MWr write data packets corresponding to the status bit data.

In addition, in a scenario of reading data, if a plurality of data packets are read at the same time, the read data packets may be acquired in other sequences than the reading sequence. In order to avoid data error, generally, only one data packet is read at one time, causing insufficient utilization of bandwidth. In order to solve this problem, in some embodiments of the present disclosure, the direct memory access architecture further includes a first input first output buffer, wherein the first input first output buffer is configured to buffer read data packets obtained after executing the read command. In addition, each of the read data packets includes a data packet tag corresponding to the read command, and the read data packets are arranged in sequence according to the data packet tags of the read data packets to obtain the read data. By buffering the plurality of data packets in the first input first output buffer, and in cooperation with data packet tags obtained according to the read command when the data packets are read, the data packets may be sorted and then stored, such that a plurality of data packets are read at one time simultaneously, thereby achieving the effect of sufficient utilization of bandwidth.

It may be understood that, when parallel reading and writing, parallel status table updating or parallel interrupt reporting are performed at the same time, the digital circuit needs to perform multi-type and high-frequency interaction with the host. In order to ensure normal data interaction, the direct memory access architecture may include a communication component connected to a target bus. The communication component is configured to send a first data packet to the target bus; or the communication component is configured to acquire a second data packet from the target bus, and send the second data packet to a corresponding component based on a data packet type of the second data packet. The first data packet refers to any kind of data packet that may be generated by the digital circuit, for example, a write data packet, or may be a terminal data packet. The second data packet refers to any kind of data packet acquired from the host, for example, a read data packet. Please refer to FIG. 1, Schedule (i.e., AXI-ST Schedule, representing an AXI bus-based communication component) in FIG. 1 is a communication component.

The digital circuit may work as an independent device, or may be integrated into another electronic device, that is, the electronic device may apply the direct memory access architecture above. The electronic device may be connected to the host via the target bus, e.g., the PCIe bus, so that the electronic device and the host form a direct memory access system.

Figure 5:
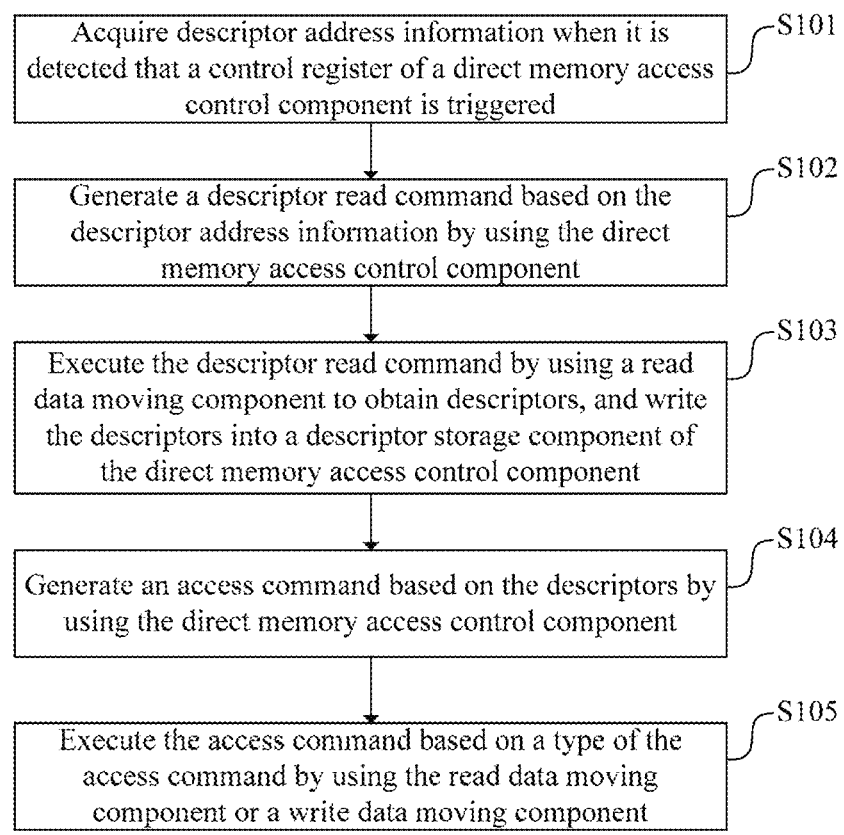
FIG. 5 is a flowchart of a direct memory access method provided according to the embodiments of the present disclosure.

Please refer to FIG. 5, FIG. 5 is a flowchart of a direct memory access method provided according to the embodiments of the present disclosure. The method includes the following operations S101 to S105.

At operation S101, when it is detected that a control register of a direct memory access control component is triggered, descriptor address information is acquired.

At operation S102, a descriptor read command is generated by using the direct memory access control component based on the descriptor address information.

At operation S103, the descriptor read command is executed by using a read data moving component to obtain descriptors, and the descriptors are written into a descriptor storage component of the direct memory access control component. It should be noted that the number of the descriptors is not limited, and the type thereof may be a read descriptor and/or a write descriptor.

At operation S104, an access command is generated based on the descriptors by using the direct memory access control component.

At operation S105, the access command is executed based on a type of the access command by using the read data moving component or a write data moving component.

It may be understood that the access command may be a read command or a write command.

Figure 6:
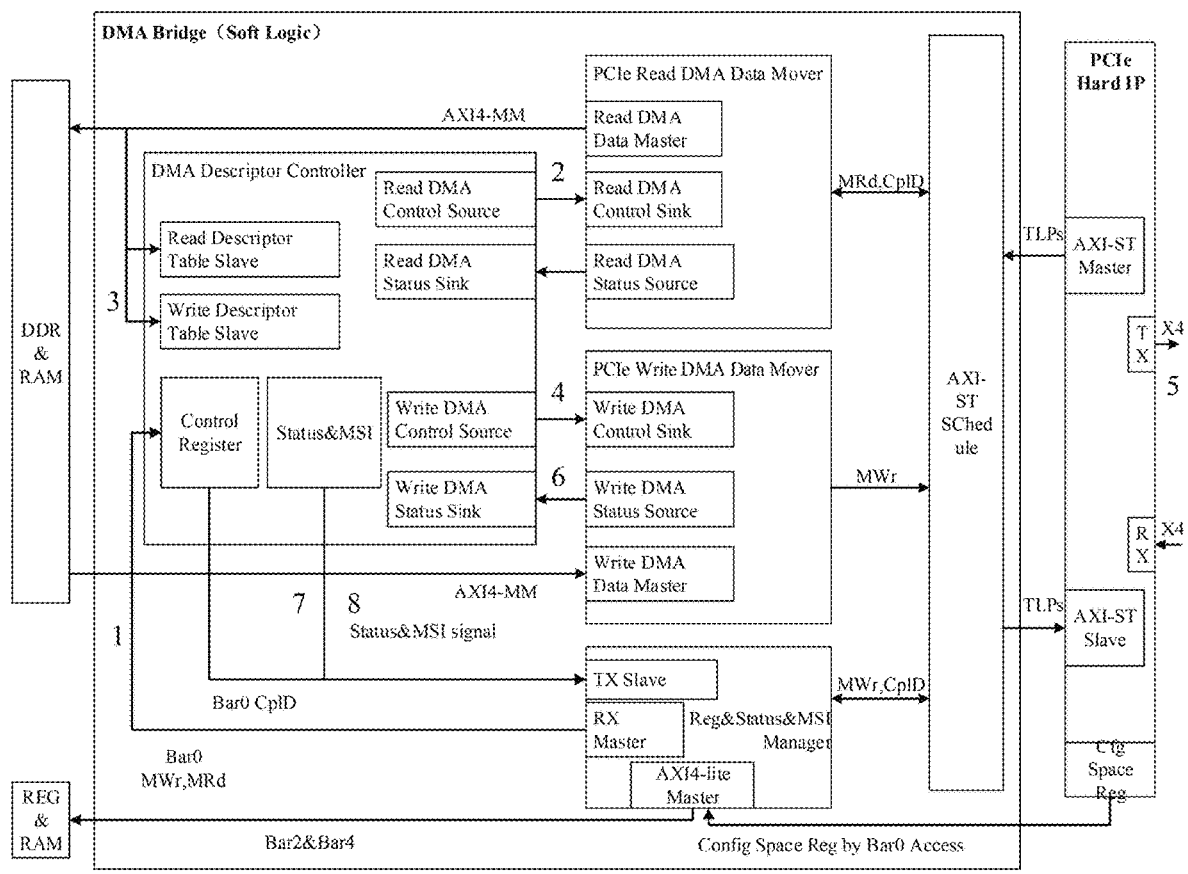
FIG. 6 is a writing flowchart of a host memory provided according to the embodiments of the present disclosure.

In some exemplary implementations, as shown in FIG. 6 which is a flowchart of the writing into a host memory provided according to the embodiments of the present disclosure, the process includes the following operations 1 to 8.

At operation 1, a host CPU sets a DMA descriptor control register and starts a DMA flow.

At operation 2, the control register commands a read data mover to acquire descriptors in a descriptor table in an upper computer (i.e., the host).

At operation 3, the acquired descriptors are stored in FPGA internal write descriptor FIFO (i.e., Read Descriptor Table Slave).

At operation 4, the control register commands a write data mover to transfer data.

At operation 5, the write data mover acquires data from a Double Data Rate (DDR, i.e., Double Data Rate Synchronous Dynamic Random Access Memory) or Random Access Memory (RAM) of the FPGA to form MWr (Memory Write) TLP packets, and moves the data to a Host system memory.

At operation 6, the write data mover generates a done bit notification (i.e., a moving completion notification), and sends the done bit notification to the control register, to notify the control register of completion of the data transfer.

At operation 7, descriptor status bits of corresponding IDs in the Host system memory are updated.

At operation 8, the control register sends MSI to the host.

Figure 7:
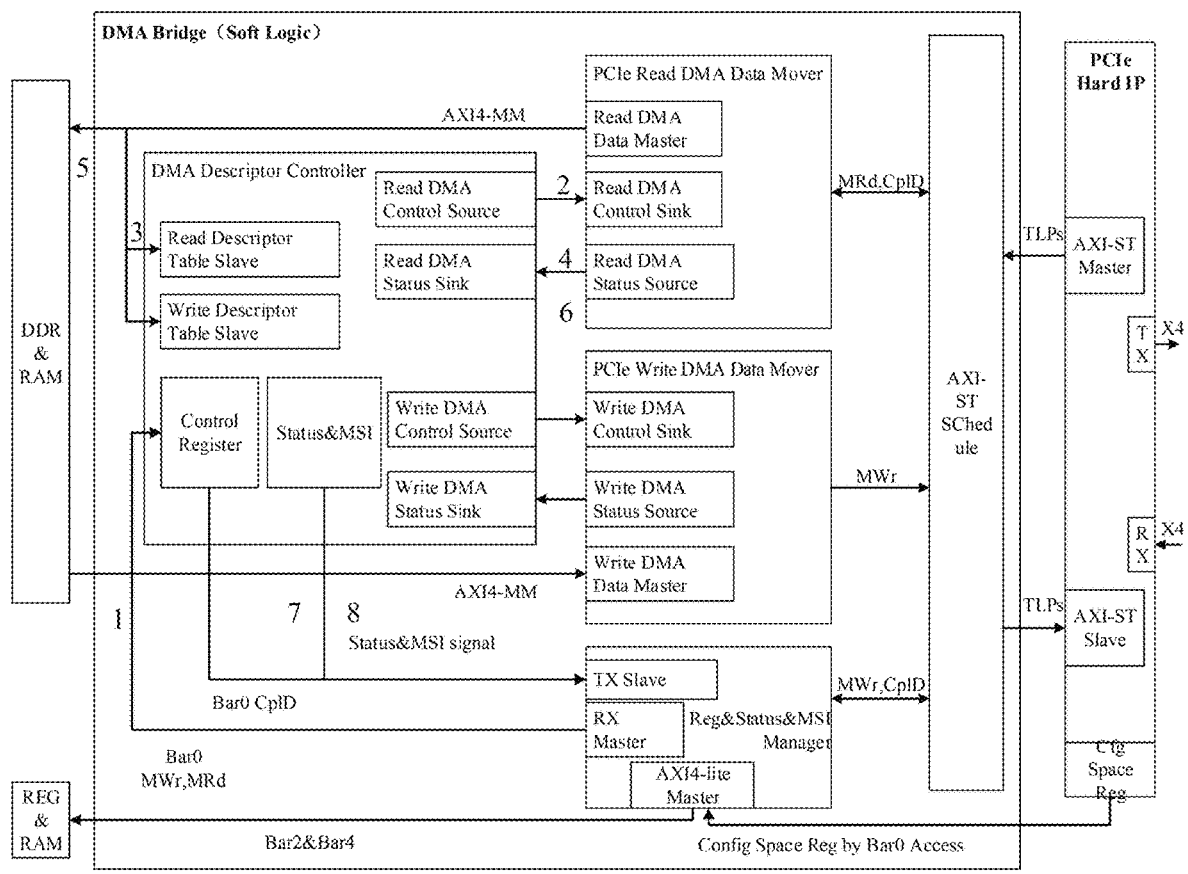
FIG. 7 is a reading flowchart of a host memory provided according to the embodiments of the present disclosure.

Please refer to FIG. 7, FIG. 7 is a reading flowchart of a host memory provided according to the embodiments of the present disclosure. The flowchart includes the following operations 1 to 8.

At operation 1, a host CPU sets a DMA descriptor control register and starts a DMA flow.

At operation 2, the control register commands a read data mover to acquire descriptors in a descriptor table in an upper computer.

At operation 3, the acquired descriptors are stored in FPGA internal read descriptor FIFO.

At operation 4, the control register commands the read data mover to send MRd (Memory Read) TLP packets, wherein each TLP data packet has a tag (i.e., a data packet tag), and the tag is generated based on message management.

At operation 5, the read data mover moves data from a Host system memory to an FPGA, and uses 16 FIFO (i.e., first input first output buffers) to receive CpID (read data packets), wherein each read data packet has a corresponding tag; data sequencing processing is performed according to the tags, and the data is written onto a corresponding bus.

At operation 6, the read data mover sends a done bit notification to the control register, to notify the control register of completion of data transfer.

At operation 7, descriptor status bits of corresponding IDs in the Host system memory are updated.

At operation 8, the control register sends MSI to the host.

By applying the direct memory access architecture provided in the embodiments of the present disclosure, the read data moving component and the write data moving component are provided, and are respectively configured to execute the read command and the write command. In addition, the read descriptor storage component and the write descriptor storage component are correspondingly provided, such that the digital circuit may implement processing of reading and writing in parallel. In addition, the read data moving component may also execute the read command obtained according to the descriptor address information, and may further move descriptors, such that the same set of components may be adopted to move both descriptors and data, thereby saving hardware resources.

Hereinafter, an electronic device provided in the embodiments of the present disclosure will be introduced. For the electronic device described below and the direct memory access method described above, reference may be made to each other.

The electronic device 100 applies the direct memory access architecture above. The electronic device 100 may include a processor 101 and a memory 102, and may further include one or more of a multimedia assembly 103, an information Input/Output (I/O) interface 104 and a communication assembly 105.

The processor 101 is configured to control an overall operation of the electronic device 100, to complete all or some operations of the direct memory access method above; and the memory 102 is configured to store various types of data to support operations on the electronic device 100, wherein these data may include, for example, instructions for any application program or method operating on the electronic device 100, as well as application program-related data. The memory 102 may be implemented by any type of transitory or non-transitory storage device or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The multimedia assembly 103 may include a screen and an audio assembly. The screen may be, for example, a touch screen, and the audio assembly is configured to output and/or input audio signals. For example, the audio assembly may include a microphone, the microphone being configured to receive external audio signals. The received audio signals may be further stored in the memory 102 or sent via the communication assembly 105. The audio assembly further includes at least one loudspeaker configured to output audio signals. The I/O interface 104 provides an interface between the processor 101 and other interface modules, and said other interface modules may be a keyboard, a mouse, buttons, etc. These buttons may be virtual buttons or physical buttons. The communication assembly 105 is configured for wired or wireless communications between the electronic device 100 and other devices. The wireless communications are e.g., Wi-Fi, Bluetooth, Near Field Communication (NFC), 2G, 3G, or 4G, or a combination of one or more thereof, and accordingly the corresponding communications assembly 105 may include: a Wi-Fi component, a Bluetooth component, and an NFC component.

The electronic device 100 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, micro-controllers, microprocessors, or other electronic elements, to perform the direct memory access method provided in the described embodiments.

Hereinafter, a computer-readable storage medium provided according to the embodiments of the present disclosure will be introduced. For the computer-readable storage medium described below and the direct memory access method described above, reference may be made to each other.

Some embodiments of the present disclosure further provide a computer-readable storage medium; the computer-readable storage medium stores a computer program, and when the computer program is executed by a processor, operations of the direct memory access method above are implemented.

The computer-readable storage medium may include: any medium that may store program codes, such as a USB flash drive, a Read-Only Memory (ROM), a Random Access Memory (RAM), a removable hard disk, a magnetic disk, or an optical disc.

The embodiments in the present description are described in a progressive manner. Each embodiment focuses on differences from other embodiments. For the same or similar parts among the embodiments, reference may be made to each other. For the apparatus disclosed in the embodiments, as the apparatus corresponds to the method disclosed in the embodiments, the illustration thereof is relatively simple, and for the related parts, reference may be made to the illustration of the method part.

A person skilled in the art may further appreciate that units and algorithm operations in examples described in combination with the embodiments disclosed herein may be achieved in the form of electronic hardware, computer software, or a combination of the two. To clearly describe the interchangeability between hardware and software, the illustration above has generally described compositions and operations of each example according to functions. Whether these functions are executed by hardware or software depends on specific applications and design constraint conditions of the technical solutions. A person skilled in the art could use different methods to implement the described functions for each particular application, but the implementation shall not be considered to go beyond the scope of some embodiments of the present disclosure.

The operations of the method or algorithm described in conjunction with the embodiments disclosed herein may also be directly implemented by hardware, by a software module executed by a processor, or by a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

Finally, it should also be noted that in the present text, relational terms such as first and second, etc. are only used to distinguish one entity or operation from another entity or operation, and do not necessarily require or imply any actual relationship or sequence between these entities or operations. Furthermore, the terms "include", "including", or any other variations thereof are intended to cover a non-exclusive inclusion, so that a process, a method, an article, or a device that includes a series of elements not only includes those elements, but also includes other elements that are not explicitly listed, or further includes inherent elements of the process, the method, the article, or the device.

The principle and embodiments of the present disclosure are described herein by applying specific examples, and the illustration of the embodiments above is only used to help understand the method and core ideas of some embodiments of the present disclosure; moreover, a person having ordinary skill in the art may make modifications to the exemplary embodiments and application ranges thereof according to the idea of some embodiments of the present disclosure. In conclusion, the content of the description shall not be construed as being limited to some embodiments of the present disclosure.

What is claimed is:

1. A direct memory access architecture for a digital circuit, wherein the direct memory access architecture is applied to the digital circuit in a target device, the target device is connected with a host via a target bus, and the direct memory access architecture comprises: a direct memory access control component, a read data moving component, a write data moving component and a data storage component; wherein the direct memory access control component comprises a control register, a read descriptor storage component, a write descriptor storage component, a read command transfer component and a write command transfer component;

the control register is configured to obtain descriptor address information based on setting from the host;

the read descriptor storage component is configured to store a read descriptor obtained by using the control register;

the write descriptor storage component is configured to store a write descriptor obtained by using the control register;

the read command transfer component is configured to send, to the read data moving component, a read command obtained based on the read descriptor or the descriptor address information;

the write command transfer component is configured to send, to the write data moving component, a write command obtained based on the read descriptor; and the read data moving component is configured to execute the read command, the write data moving component is configured to execute the write command, and the data storage component is configured to store read data obtained after executing the read command;

wherein the direct memory access control component is configured to receive a moving completion notification sent by the read data moving component and a moving completion notification sent by the write data moving component; and the direct memory access control component comprises a status updating component, wherein the status updating component is configured to update, upon detecting completion of execution of a target descriptor, target status bit data corresponding to the target descriptor in a system memory of the host;

further comprising a first input first output buffer, wherein the first input first output buffer is configured to buffer read data packets obtained after executing the read command; and each of the read data packets comprises a data packet tag corresponding to the read command, and the read data packets are arranged in sequence according to the data packet tags of the read data packets to obtain the read data;

wherein the target status bit data in a target status table corresponding to the target descriptor in the host can be updated via a status and interrupt reporting component in a status and interrupt management component.

2. The direct memory access architecture according to claim 1, wherein the digital circuit is a field programmable gate array circuit or a digital integrated circuit.

3. The direct memory access architecture according to claim 1, wherein the direct memory access control component is configured to receive a moving completion notification sent by the read data moving component and a moving completion notification sent by the write data moving component; and the direct memory access control component comprises a status updating component, wherein the status updating component is configured to update, upon detecting completion of execution of a target descriptor, target status bit data corresponding to the target descriptor in a system memory of the host.

4. The direct memory access architecture according to claim 1, further comprising a first input first output buffer, wherein the first input first output buffer is configured to buffer read data packets obtained after executing the read command; and each of the read data packets comprises a data packet tag corresponding to the read command, and the read data packets are arranged in sequence according to the data packet tags of the read data packets to obtain the read data.

5. The direct memory access architecture according to claim 3, wherein the direct memory access control component comprises an interrupt reporting component, wherein the interrupt reporting component is configured to send an interrupt message to the host upon detecting completion of execution of the target descriptor.

6. The direct memory access architecture according to claim 1, further comprising: a communication component connected to the target bus;

wherein the communication component is configured to send a first data packet to the target bus; or the communication component is configured to acquire a second data packet from the target bus, and send the second data packet to a corresponding component based on a data packet type of the second data packet.

7. The direct memory access architecture according to claim 1, wherein the read descriptor storage component and the write descriptor storage component are first input first output memories, and the read descriptor storage component and the write descriptor storage component are predefined with storage addresses; and the control register comprises a source address register, a destination address register, a descriptor size register and a trigger register, wherein the destination address register is configured to store any one of the storage addresses.

8. The direct memory access architecture according to claim 1, wherein the control register is configured to perform space access via a base address register.

9. The direct memory access architecture according to claim 1, wherein a system memory of the host comprises a descriptor table, wherein the descriptor table has a space for storing descriptors.

10. The direct memory access architecture according to claim 9, wherein the descriptor table comprises status tables corresponding to the descriptors on a one-to-one basis, wherein data in the status tables is allowed to be updated according to execution conditions of the descriptors.

11. The direct memory access architecture according to claim 9, wherein the host is configured to be divided into two independent memory spaces, wherein the two independent memory spaces are respectively used to store a read descriptor and a status table corresponding to the read descriptor, and a write descriptor and a status table corresponding to the write descriptor.

12. The direct memory access architecture according to claim 1, wherein the host is configured to configure the control register, such that the control register reads a base address of the read descriptor.

13. The direct memory access architecture according to claim 3, wherein the status updating component comprises: a read status acquisition component connected to a read status generation component in the read data moving component, wherein the read status generation component is configured to send a moving completion notification to the read status acquisition component after the read command generates the moving completion notification.

14. The direct memory access architecture according to claim 3, wherein the status updating component comprises: a write status acquisition component connected to a write status generation component in the read data moving component, wherein the write status acquisition component is configured to send a moving completion notification to the write status reading component after the write command generates the moving completion notification.

15. The direct memory access architecture according to claim 6, wherein the first data packet comprises at least one of: a write data packet and a terminal data packet; and the second data packet comprises: a read data packet.

16. An electronic device, the electronic device applying a direct memory access architecture, wherein the direct memory access architecture is applied to a digital circuit in the electronic device, the electronic device is connected with a host via a target bus, and the direct memory access architecture comprises: a direct memory access control component, a read data moving component, a write data moving component and a data storage component;

wherein the direct memory access control component comprises a control register, a read descriptor storage component, a write descriptor storage component, a read command transfer component and a write command transfer component;

the control register is configured to obtain descriptor address information based on setting from the host;

the read descriptor storage component is configured to store a read descriptor obtained by using the control register;

the write descriptor storage component is configured to store a write descriptor obtained by using the control register;

the read command transfer component is configured to send, to the read data moving component, a read command obtained based on the read descriptor or the descriptor address information;

the write command transfer component is configured to send, to the write data moving component, a write command obtained based on the read descriptor; and the read data moving component is configured to execute the read command, the write data moving component is configured to execute the write command, and the data storage component is configured to store read data obtained after executing the read command.

17. A direct memory access system, comprising a host and an electronic device, wherein the host and the electronic device are connected via a target bus, the electronic device applies a direct memory access architecture, wherein the direct memory access architecture is applied to a digital circuit in the electronic device, and the direct memory access architecture comprises: a direct memory access control component, a read data moving component, a write data moving component and a data storage component;

wherein the direct memory access control component comprises a control register, a read descriptor storage component, a write descriptor storage component, a read command transfer component and a write command transfer component;

the control register is configured to obtain descriptor address information based on setting from the host;

the read descriptor storage component is configured to store a read descriptor obtained by using the control register;

the write descriptor storage component is configured to store a write descriptor obtained by using the control register;

the read command transfer component is configured to send, to the read data moving component, a read command obtained based on the read descriptor or the descriptor address information;

the write command transfer component is configured to send, to the write data moving component, a write command obtained based on the read descriptor; and the read data moving component is configured to execute the read command, the write data moving component is configured to execute the write command, and the data storage component is configured to store read data obtained after executing the read command.

18. A direct memory access method, applied to the electronic device according to claim 16, and the method comprising:

acquiring descriptor address information when it is detected that a control register of a direct memory access control component is triggered;

generating a descriptor read command based on the descriptor address information by using the direct memory access control component;

executing the descriptor read command by using a read data moving component to obtain descriptors, and writing the descriptors into a descriptor storage component of the direct memory access control component;

generating an access command based on the descriptors by using the direct memory access control component; and executing the access command based on a type of the access command by using the read data moving component or a write data moving component.

19. The direct memory access method according to claim 18, wherein the method further comprises: sending an interrupt message to a host upon detecting completion of execution of a target descriptor.

20. A computer-readable storage medium for storing a computer program, wherein the computer program, when executed by a processor, implements the direct memory access method according to claim 18.

* * * * *